(12) United States Patent
Khalil et al.

(10) Patent No.: US 11,661,548 B2
(45) Date of Patent: May 30, 2023

(54) SEMICONDUCTING NANOPARTICLE

(71) Applicant: Merck Patent GmbH, Darmstadt (DE)

(72) Inventors: Sanaa Khalil, Jerusalem (IL); Artyom Semyonov, Rehovot (IL); Kobi Yaacov Netanel Oded, Jerusalem (IL)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/971,699

(22) PCT Filed: Feb. 19, 2019

(86) PCT No.: PCT/EP2019/054021
§ 371 (c)(1),
(2) Date: Aug. 21, 2020

(87) PCT Pub. No.: WO2019/162242
PCT Pub. Date: Aug. 29, 2019

(65) Prior Publication Data
US 2021/0363418 A1 Nov. 25, 2021

(30) Foreign Application Priority Data
Feb. 22, 2018 (EP) .................... 18158206

(51) Int. Cl.
*C09K 11/06* (2006.01)
*C09K 11/02* (2006.01)
*C09K 11/70* (2006.01)
*B82Y 20/00* (2011.01)
*B82Y 30/00* (2011.01)
*B82Y 40/00* (2011.01)

(52) U.S. Cl.
CPC .............. *C09K 11/06* (2013.01); *C09K 11/02* (2013.01); *C09K 11/025* (2013.01); *C09K 11/70* (2013.01); *B82Y 20/00* (2013.01); *B82Y 30/00* (2013.01); *B82Y 40/00* (2013.01)

(58) Field of Classification Search
CPC .......... C09K 1/025; B82Y 20/00; B82Y 40/00
See application file for complete search history.

(56) References Cited

U.S. PATENT DOCUMENTS

| 8,124,230 | B2 | 2/2012 | Zimmerman et al. |
| 10,941,163 | B2 | 3/2021 | Dilocker et al. |
| 2008/0272347 | A1 | 11/2008 | Fukuda et al. |
| 2009/0073349 | A1* | 3/2009 | Park ............ G03F 7/0002 349/69 |
| 2012/0135141 | A1 | 5/2012 | Ying et al. |
| 2017/0022412 | A1 | 1/2017 | Qiu |
| 2018/0362551 | A1 | 12/2018 | Dilocker et al. |
| 2018/0371312 | A1 | 12/2018 | Dirscherl |

FOREIGN PATENT DOCUMENTS

| CN | 103343008 A | 10/2013 |
| DE | 102015121720 A1 | 6/2017 |
| EP | 1864991 A1 | 12/2007 |
| JP | 2016000803 A | 1/2016 |
| TW | 201728596 A | 8/2017 |
| WO | 2017086362 A1 | 5/2017 |

OTHER PUBLICATIONS

International Search report PCT/EP2019/054021 dated Jul. 8, 2019 (pp. 1-6).
Krini et al.,: "Photosensitive functionalized surface-modified quantum dots for polymeric structures via two-photon-initiated polymerization technique"; Macromol. Rapid Commun., 2015, 36,1108-1114.
Marta Liras :"Acetyl protected thiol methacrylic polymers as effective ligands to keep quantum dots in luminescent standby mode": Polym. Chem. 2014, 5, 433-442.
Kim: "Heat- and water-proof quantum dot/siloxane composite film: Effect of quantum dot-siloxane linkage":Journal of the SID 25/2, 2017.
Crouse: "Influencing Solvent Miscibility and Aqueous Stability of Oxide Passivated Aluminum Nanoparticles through Surface Functionalization with Acrylic Monomers": ACS Applied Materials in Interfaces, vol. 2, No. 9, 2010, 2560-2569.
Pu: "To Battle Surface Traps on CdSe/CdS Core/Shell Nanocrystals: Shell Isolation versus Surface Treatment": J. Am Chem. Soc. 2016, 138, 8134-8142.
Kalyuzhny: "Ligand Effects on Optical Properties of CdSe Nanocrystals"; J. Phys. Chem. B, 2005, 109, 7012-7021.
Search report in corresponding EP19705525.4 dated Feb. 18, 2022 (pp. 1-20).
English translation of Office Action in corresponding JP application 2020-544541 dated Oct. 21, 2022 (pp. 1-4).
English translation of Office Action in corresponding ROC (Taiwan) Patent Application No. 108105722 dated Oct. 12, 2022 (pp. 1-6).

* cited by examiner

*Primary Examiner* — C Melissa Koslow
(74) *Attorney, Agent, or Firm* — Millen White Zelano & Branigan, PC; Brion P. Heaney

(57) ABSTRACT

The present invention relates to a semiconducting nanoparticle.

25 Claims, 1 Drawing Sheet

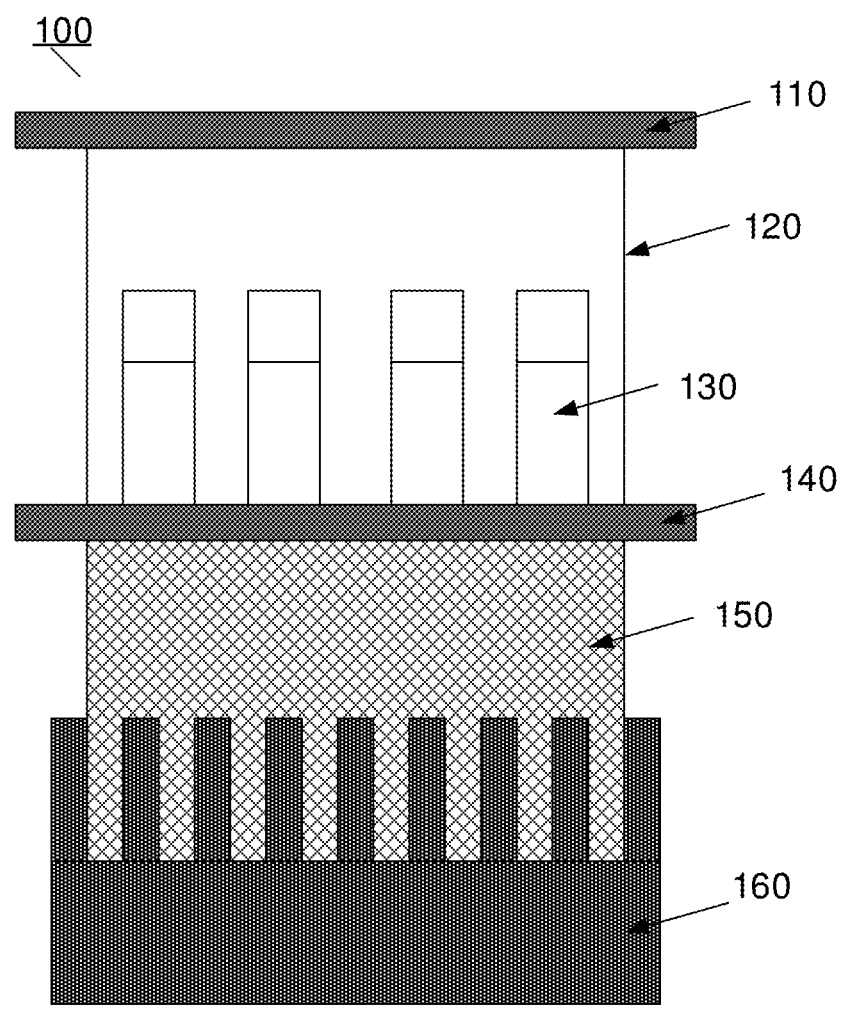

SEMICONDUCTING NANOPARTICLE

FIELD OF THE INVENTION

The present invention relates to a semiconducting light emitting nanoparticle; a process for preparing thereof, use of a semiconducting light emitting nanoparticle, a composition or formulation; or devices.

BACKGROUND ART

U.S. Pat. No. 8,124,230 B2 discloses a hafnium oxide nanoparticles functionalized by a dialkylphosphate.

J. Am. Chem. Soc. 2016, 138, 8134-8142, and J. Phys. Chem. B, 2005, 109, 7012-7021 disclose an enhancement of quantum yield by addition of Zinc formate to Cd-based quantum dots in chloroform.

Polym. Chem. 2014, 5, 435 mentions CdSe quantum dots functionalized by thioacetylated polymers.

US 2017/0022412 A1 mentions InP/ZnSe/ZnS quantum dots functionalized by acrylate oligomers containing a sulfur atom.

Journal of the SID 25/2, 2017 discloses CdSe/ZnS functionalized by oleic acid chemically linked to siloxane (methacrylate) matrix.

ACS Applied Materials in Interfaces, Vol. 2, No. 9, 2560-2569, 2010 mentions aluminium nanoparticles functionalized by 2-carboxyethylacrylate.

PATENT LITERATURE

1. U.S. Pat. No. 8,124,230 B2
2. US 2017/0022412 A1

NON-PATENT LITERATURE

3. Polym. Chem. 2014, 5, 435
4. Journal of the SID 25/2, 2017
5. ACS Applied Materials in Interfaces, Vol. 2, No. 9, 2010, 2560-2569
6. J. Am. Chem. Soc. 2016, 138, 8134-8142
7. J. Phys. Chem. B, 2005, 109, 7012-7021

SUMMARY OF THE INVENTION

However, the inventors newly have found that there are still one or more of considerable problems for which improvement is desired as listed below.
1. A novel semiconducting light emitting nanoparticle, which can show improved quantum yield, preferably in a solvent, more preferably in a polar solvent, is desired.
2. A novel semiconducting light emitting nanoparticle, which can show stable dispersion in a solvent, more preferably in a polar solvent, even more preferably in a polar solvent with higher concentration of said nanoparticles, is requested.
3. A novel semiconducting light emitting nanoparticle, which can show improved long-term stability, preferably in a solvent, more preferably in a polar solvent, is desired.
4. A novel semiconducting light emitting nanoparticle, which has improved stable surface, is requested.
5. A simple process for fabricating a semiconducting light emitting nanoparticle, which can show an improved quantum yield, preferably in a solvent, more preferably in a polar solvent, is desired.
6. A simple process for fabricating a semiconducting light emitting nanoparticle, which can show an improved long-term stability, preferably in a solvent, more preferably in a polar solvent, is requested.

The inventors aimed to solve one or more of the problems indicated above 1 to 6.

Then, it was found a novel semiconducting light emitting nanoparticle comprising, essentially consisting of, or consisting of, at least a core, optionally one or more shell layers, and a compound represented by chemical formula (I)

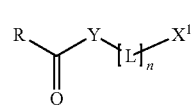

(I)

wherein n is 0 or 1, preferably n is 1;
R is

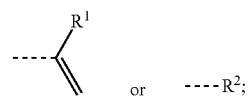

Y is S or O;
$R^1$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$ groups where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$ groups, $R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^2$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$; where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$;

L is a divalent group, preferably it is represented by following chemical formula (II) or (III),

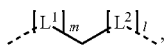 (II)

 (III)

$L^1$ is

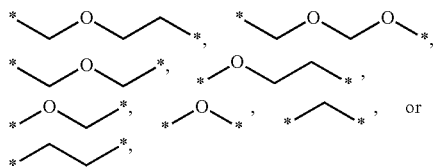

preferably $L^1$ is

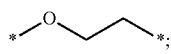

$L^2$ is

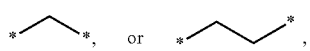

preferably $L^2$ is

where symbol "*" is a connecting point,
where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$, and where one or more H atoms may be replaced by D, F, Cl, Br, I, CN or $NO_2$, or an aromatic or heteroaromatic ring system having 5 to 60 aromatic ring atoms, which may be substituted by one or more $R^a$;
$0 \leq m \leq 50$, preferably $1 \leq m \leq 25$, more preferably $2 \leq m \leq 20$, furthermore preferably $4 \leq m \leq 12$; $0 \leq l \leq 50$, preferably $1 \leq l \leq 25$, more preferably $2 \leq l \leq 20$, furthermore preferably $4 \leq l \leq 12$;
$X^1$ is an anchor group selected from the group consisting of carboxylate group ($-COOM^1$), a primary ($-PO(OH)(OM^1)$) or secondary ($-PO(OM^1)_2$) phosphonate group, a xanthate group ($-OCS_2M^1$), $-N(M^1)_2$, $SO_3\ M^1$, $S\ M^1$, $SiOR^2$ or ($-N(CS_2\ M^1)_2$);
$M^1$ denotes a hydrogen atom, or a metal cation selected from ½ $Mg^{2+}$, ½ $Cu^{2+}$, ½ $Zn^{2+}$ or ½ $Cd^{2+}$, preferably a hydrogen atom, ½ $Mg^{2+}$, ½ $Cu^{2+}$, or ½ $Zn^{2+}$, more preferably a hydrogen atom.

In another aspect, the invention relates to a process for preparing for the nanoparticle, wherein the process comprises, essentially consisting of, or consisting of, at least the following step (a), optionally step (b) and step (c) in this sequence;
(a) mixing a nanoparticle having at least a core and optionally one or more shell layers, a compound and another material, preferably said another material is a solvent to get a mixture,
(b) optionally adding a second compound to said mixture,
(c) subjecting the mixture to a photo irradiation having a peak light wavelength in the range from 300 to 650 nm to the semiconducting light emitting nanoparticle, preferably in the range from 320 to 520 nm, more preferably from 350 nm to 500 nm, even more preferably from 360 nm to 470 nm,
wherein said compound in step (a) is represented by chemical formula (I)

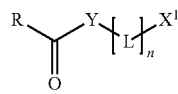 (I)

wherein n is 0 or 1, preferably n is 1;
R is

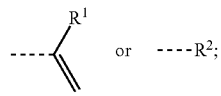

Y is S or O;
$R^1$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$ groups where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$ groups, $R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^2$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$; where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$;

L is a divalent group, preferably it is represented by following chemical formula (II) or (III),

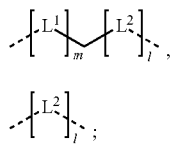
(II)

(III)

$L^1$ is

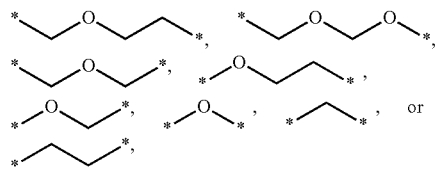

preferably $L^1$ is

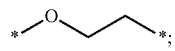

$L^2$ is

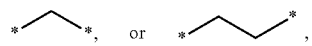

preferably $L^2$ is

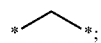

where symbol "*" is a connecting point,
where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$, and where one or more H atoms may be replaced by D, F, Cl, Br, I, CN or $NO_2$, or an aromatic or heteroaromatic ring system having 5 to 60 aromatic ring atoms, which may be substituted by one or more $R^a$;
$0 \le m \le 50$, preferably $1 \le m \le 25$, more preferably $2 \le m \le 20$, furthermore preferably $4 \le m \le 12$; $0 \le l \le 50$, preferably $1 \le l \le 25$, more preferably $2 \le l \le 20$, furthermore preferably $4 \le l \le 12$;
$X^1$ is an anchor group selected from the group consisting of carboxylate group (—$COOM^1$), a primary (—$PO(OH)(OM^1)$) or secondary (—$PO(OM^1)_2$) phosphonate group, a xanthate group (—$OCS_2M^1$), —$N(M^1)_2$, $SO_3$ $M^1$, S $M^1$, $SiOR^2$ or (—$N(CS_2 M^1)_2$);
$M^1$ denotes a hydrogen atom, or a metal cation selected from ½ $Mg^{2+}$, ½ $Cu^{2+}$, ½ $Zn^{2+}$ or ½ $Cd^{2+}$, preferably a hydrogen atom, ½ $Mg^{2+}$, ½ $Cu^{2+}$, or ½ $Zn^{2+}$, more preferably a hydrogen atom.

The negatively charged polymer and the positively charged metal ion (e.g. $Zn^{2+}$) of the compound compensate each other as described in the following formula (I').

$$[\text{polymer}]^{u-} pM^{m+} \quad \text{(I')}$$

wherein symbols p, m, u are each independently an integer, p*m=u.

and wherein said $2^{nd}$ compound in step (b) is represented by chemical formula (IV),

$M^2$ is a metal cation selected from $Mg^{2+}$, $Cu^{2+}$, $Zn^{2+}$ or $Cd^{2+}$, preferably $Mg^{2+}$, $Cu^{2+}$ or $Zn^{2+}$, more preferably $Zn^{2+}$;
l is 1 in case m is 2−, l is 2 in case m is 1−;
Z is a counter anion, preferably represented by following chemical formula (V), or chemical formula (VI),

wherein $A^3$ is N, O or S;
b is 1 in case $A^3$ is N, b is 0 in case $A^3$ is O, S;
$A^1$ is O or S;
$A^2$ is $O^-$ or $S^-$;
$R^3$ is H, D, a straight alkyl or alkoxy group having 1 to 40 carbon atoms, preferably 1 to 25 carbon atoms, more preferably 1 to 15 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$ groups where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$ groups,
$R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;
$R^4$ is H, D, a straight alkyl or alkoxy group having 1 to 40 carbon atoms, preferably 1 to 25 carbon atoms, more preferably 1 to 15 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more radicals $R^a$; where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$;

$$(O_2CR^5)_2 \quad \text{(VI)}$$

$R^5$ is a straight alkyl group having 1 to 15 carbon atoms, preferably 1 to 10 carbon atoms, more preferably 1 to 8 carbon atoms, even more preferably 1 to 4 carbon atoms, further more preferably 1 to 2 carbon atoms, which may in each case be substituted by one or more $R^a$; where one or more non-adjacent $CH_2$ groups may be replaced by $R^aC=CR^a$, C≡C, $Si(R^a)_2$, $Ge(R^a)_2$, $Sn(R^a)_2$, C=O, C=S, C=Se, C=$NR^a$, P(=O)($R^a$), SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$, preferably $R^5$ is an unsubstituted straight alkyl group.

In another aspect, the present invention relates to a semiconducting light emitting nanoparticle obtainable or obtained from the process.

In another aspect, the present invention further relates to composition comprising, essentially consisting of, or consisting of, at least the semiconducting light emitting nanoparticle,
and one additional material, preferably the additional material is selected from one or more members of the group consisting of organic light emitting materials, inorganic light emitting materials, charge transporting materials, scattering particles, optically transparent polymers, anti-oxidants, radical quenchers, photo initiators and surfactants.

In another aspect, the invention furthermore relates to formulation comprising, essentially consisting of, or consisting of, at least the semiconducting light emitting nanoparticle, or the composition,
and one solvent, preferably it is selected from one or more members of the group consisting of esters such as, PGMEA (propylene glycol methyl ether acetate), ethyl acetate, butyl acetate, amyl acetate, ethylene carbonate, methoxy propyl acetate or Ketones such as methyl ethyl ketone (MEK), methyl isobutyl ketone, cyclohexanone, or ethylene glycol such as propylene glycol, butylene glycol, triethylene glycol, glycol ethers, heylene glycol, or ethers such as, diethyl ethers, tetrahydrofuran, or alcohols such as, methanol, ethanol, isopropanol, and butanol In another aspect, the invention further relates to use of the semiconducting light emitting nanoparticle, or the composition, or formulation, in an electronic device, optical device or in a biomedical device.

In another aspect, the invention also relates to an optical medium comprising at least one nanoparticle, or the composition, or formulation of the present invention.

In another aspect, the invention further relates to an optical device comprising at least one optical medium of the present invention.

Further advantages of the present invention will become evident from the following detailed description.

DESCRIPTION OF DRAWINGS

FIG. 1: shows a cross sectional view of a schematic of illumination setup used in the working example 1.

LIST OF REFERENCE SIGNS IN FIG. 1

100. an illumination setup
110. a cover
120. a plastic cylinder
130. a sealed sample vial
140. Perspex®
150. LED
160. a heatsink

DETAILED DESCRIPTION OF THE INVENTION

In one aspect of the present invention, said semiconducting light emitting nanoparticle comprising, essentially consisting of, or consisting of, at least a core, optionally one or more shell layers, and a compound represented by chemical formula (I)

wherein n is 0 or 1, preferably n is 1;
R is

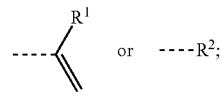

Y is S or O;
$R^1$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$ groups where one or more non-adjacent $CH_2$ groups may be replaced by $R^aC=CR^a$, C≡C, $Si(R^a)_2$, $Ge(R^a)_2$, $Sn(R^a)_2$, C=O, C=S, C=Se, C=$NR^a$, P(=O)($R^a$), SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$ groups, $R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^2$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$;
where one or more non-adjacent $CH_2$ groups may be replaced by $R^aC=CR^a$, C≡C, $Si(R^a)_2$, $Ge(R^a)_2$, $Sn(R^a)_2$, C=O, C=S, C=Se, C=$NR^a$, P(=O)($R^a$), SO, $SO_2$, $NR^a$, OS, or CONR$^a$ and where one or more H atoms may be replaced by D, F, Cl, Br, I, CN or NO$_2$, or an aromatic or heteroaromatic ring system having 5 to 60 aromatic ring atoms, which may be substituted by one or more R$^a$;

L is a divalent group, preferably it is represented by following chemical formula (II) or (III),

(II)

(III)

L$^1$ is

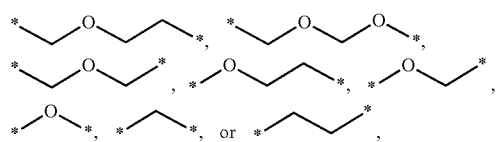

preferably L$^1$ is

L$^2$ is

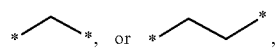

preferably L$^2$ is

where symbol "*" is a connecting point,
where one or more non-adjacent CH$_2$ groups may be replaced by R$^a$C=CR$^a$, C≡C, Si(R$^a$)$_2$, Ge(R$^a$)$_2$, Sn(R$^a$)$_2$, C=O, C=S, C=Se, C=NR$^a$, P(=O)(R$^a$), SO, SO$_2$, NR$^a$, OS, or CONR$^a$, and where one or more H atoms may be replaced by D, F, Cl, Br, I, CN or NO$_2$, or an aromatic or heteroaromatic ring system having 5 to 60 aromatic ring atoms, which may be substituted by one or more R$^a$;
0≤m≤50, preferably 1≤m≤25, more preferably 2≤m≤20, furthermore preferably 4≤m≤12; 0≤l≤50, preferably 1≤l≤25, more preferably 2≤l≤20, furthermore preferably 4≤l≤12;

X$^1$ is an anchor group selected from the group consisting of carboxylate group (—COOM$^1$), a primary (—PO(OH)(OM$^1$)) or secondary (—PO(OM$^1$)$_2$) phosphonate group, a xanthate group (—OCS$_2$M$^1$), —N(M$^1$)$_2$, SO$_3$ M$^1$, S M$^1$, SiOR$^2$ or (—N(CS$_2$ M$^1$)$_2$);

M$^1$ denotes a hydrogen atom, or a metal cation selected from ½ Mg$^{2+}$, ½ Cu$^{2+}$, ½ Zn$^{2+}$ or ½ Cd$^{2+}$, preferably a hydrogen atom, ½ Mg$^{2+}$, ½ Cu$^{2+}$ or ½ Zn$^{2+}$, more preferably a hydrogen atom.

In some embodiments of the present invention, preferably Y is O in case R is

,

Y is S in case R is ---------R$^2$,

In some embodiments of the present invention, more preferably Y is O and R is

.

In some embodiments of the present invention, more preferably Y is S and R is ---------R$^2$.

In some embodiments of the present invention, the nanoparticle comprises a core, optionally one or more shell layers, and the compound of chemical formula (I) in this sequence.

In some embodiments, said compound can be physically attached onto the outermost surface of the core or the shell layers.

In some embodiments of the present invention, the nanoparticle further comprises a 2$^{nd}$ compound represented by following chemical formula (IV), $$M^2(Z^m)_l \quad (IV)$$

M$^2$ is a metal cation selected from Mg$^{2+}$, Cu$^{2+}$, Zn$^{2+}$ or Cd$^{2+}$, preferably Mg$^{2+}$, Cu$^{2+}$ or Zn$^{2+}$, more preferably Zn$^{2+}$;
l is 1 in case m is 2$^-$, l is 2 in case m is 1$^-$;
Z is a counter anion, preferably represented by following chemical formula (V), or chemical formula (VI),

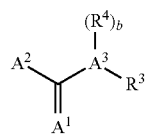
(V)

wherein A$^3$ is N, O or S;
b is 1 in case A$^3$ is N, b is 0 in case A$^3$ is O, S;
A$^1$ is O or S;
A$^2$ is O$^-$ or S$^-$;
R$^3$ is H, D, a straight alkyl or alkoxy group having 1 to 40 carbon atoms, preferably 1 to 25 carbon atoms, more preferably 1 to 15 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more R$^a$ groups where one or more non-adjacent CH$_2$ groups may be replaced by R$^a$C=CR$^a$, C≡C, Si(R$^a$)$_2$, Ge(R$^a$)$_2$, Sn(R$^a$)$_2$, C=O, C=S, C=Se, C=NR$^a$, P(=O)(R$^a$), SO, SO$_2$, NR$^a$, OS, or CONR$^a$ and where one or more H atoms may be replaced by D, F, Cl, Br, I, CN or NO$_2$, or an aromatic or heteroaromatic ring system having 5 to 60 aromatic ring atoms, which may be substituted by one or more R$^a$ groups, $R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^4$ is H, D, a straight alkyl or alkoxy group having 1 to 40 carbon atoms, preferably 1 to 25 carbon atoms, more preferably 1 to 15 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more radicals $R^a$; where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$;

$(O_2CR^5)_2$ (VI)

$R^5$ is a straight alkyl group having 1 to 15 carbon atoms, preferably 1 to 10 carbon atoms, more preferably 1 to 8 carbon atoms, even more preferably 1 to 4 carbon atoms, further more preferably 1 to 2 carbon atoms, which may in each case be substituted by one or more $R^a$; where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$, preferably $R^5$ is an unsubstituted straight alkyl group.

In some embodiments of the present invention, the weight ratio of the compound of chemical formula (I) and the compound of chemical formula (IV) is in the range of 1:100 (the compound of chemical formula:the compound of chemical formula (IV)), preferably it is 3:50, more preferably 1:4.

Such chemical compounds can be obtained from the public for examples, from Sigma Aldrich.

Semiconducting Light Emitting Nanoparticle

According to the present invention, as an inorganic part of the semiconducting light emitting nanoparticle, a wide variety of publicly known semiconducting light emitting nanoparticles can be used as desired.

A type of shape of the semiconducting light emitting nanoparticle of the present invention is not particularly limited.

Any type of semiconducting light emitting nanoparticles, for examples, spherical shaped, elongated shaped, star shaped, polyhedron shaped semiconducting light emitting nanoparticles, can be used.

In some embodiments of the present invention, said one or more shell layers of the semiconducting light emitting nanoparticle is a single shell layer, double shell layers, or multishell layers having more than two shell layers, preferably, it is double shell layers.

According to the present invention, the term "shell layer" means the structure covering fully or partially said core.

Preferably, said one or more shell layers fully covers said core. The term "core" and "shell" are well known in the art and typically used in the field of quantum materials, such as U.S. Pat. No. 8,221,651 B2.

According to the present invention, the term "nano" means the size in between 0.1 nm and 999 nm. Preferably, it is from 1 nm to 150 nm.

In a preferred embodiment of the present invention, the semiconducting light emitting nanoparticle of the present invention is a quantum sized material.

According to the present invention, the term "quantum sized" means the size of the semiconductor material itself without compounds or another surface modification, which can show the quantum confinement effect, like described in, for example, ISBN:978-3-662-44822-9.

In some embodiments of the invention, the size of the overall structures of the quantum sized material, is from 1 nm to 100 nm, more preferably, it is from 1 nm to 30 nm, even more preferably, it is from 5 nm to 15 nm.

According to the present invention, said core of the semiconducting light emitting nanoparticle can be varied.

For example, CdS, CdSe, CdTe, ZnS, ZnSe, ZnSeS, ZnTe, ZnO, GaAs, GaP, GaSb, HgS, HgSe, HgSe, HgTe, InAs, InP, InPS, InPZnS, InPZn, InPGa, InSb, AlAs, AlP, AlSb, $Cu_2S$, $Cu_2Se$, $CuInS_2$, $CuInSe_2$, $Cu_2(ZnSn)S_4$, $Cu_2(InGa)S_4$, $TiO_2$ alloys and a combination of any of these can be used.

In a preferred embodiment of the present invention, said core of the semiconducting light emitting nanoparticle comprises one or more of group 13 elements of the periodic table and one or more of group 15 elements of the periodic table. For example, GaAs, GaP, GaSb, InAs, InP, InPS, InPZnS, InPZn, InPGa, InSb, AlAs, AlP, AlSb, $CuInS_2$, $CuInSe_2$, $Cu_2(InGa)S_4$, and a combination of any of these.

Even more preferably, the core comprises In and P atoms. For example, InP, InPS, InPZnS, InPZn, InPGa.

In some embodiments of the present invention, at least one of the shell layers comprises a $1^{st}$ element of group 12, 13 or 14 of the periodic table and a $2^{nd}$ element of group 15 or 16 of the periodic table, preferably, all shall layers comprises a $1^{st}$ element of group 12, 13 or 14 of the periodic table and a $2^{nd}$ element of group 15 or 16 of the periodic table.

In a preferred embodiment of the present invention, at least one of the shell layers comprises a $1^{st}$ element of group 12 of the periodic table and a $2^{nd}$ element of group 16 of the periodic table. For examples, CdS, CdZnS, ZnS, ZnSe, ZnSSe, ZnSSeTe, CdS/ZnS, ZnSe/ZnS, ZnS/ZnSe shell layers can be used. Preferably, all shall layers comprises a $1^{st}$ element of group 12 of the periodic table and a $2^{nd}$ element of group 16 of the periodic table.

More preferably, at least one shell layer is represented by following formula (III), $$ZnS_xSe_yTe_z, \qquad (III)$$

wherein the formula (I), $0\leq x\leq 1$, $0\leq y\leq 1$, $0\leq z\leq 1$, and x+y+z=1, with even more preferably being of $0\leq x\leq 1$, $0\leq y\leq 1$, z=0, and x+y=1.

For examples, ZnS, ZnSe, ZnSeS, ZnSeSTe, CdS/ZnS, ZnSe/ZnS, ZnS/ZnSe shell layers can be used preferably.

Preferably, all shell layers are represented by formula (III).

For example, as a semiconducting light emitting nanoparticle for green and/or red emission use, CdSe/CdS, CdSeS/CdZnS, CdSeS/CdS/ZnS, ZnSe/CdS, CdSe/ZnS, InP/ZnS, InP/ZnSe, InP/ZnSe/ZnS, InP/ZnS/ZnSe, InPZn/ZnS, InPZn/ZnSe/ZnS, InPZn/ZnS/ZnSe, ZnSe/CdS, ZnSe/ZnS semiconducting light emitting nanoparticle or combination of any of these, can be used.

More preferably, it is InP/ZnS, InP/ZnSe, InP/ZnSe/ZnS, InP/ZnS/ZnSe, InPZn/ZnS, InPZn/ZnSe/ZnS, InPZn/ZnS/ZnSe can be used.

In a preferred embodiment of the present invention, said shell layers of the semiconducting light emitting nanoparticle are double shell layers.

Said semiconducting light emitting nanoparticles are publicly available, for example, from Sigma-Aldrich and/or described in, for example, ACS Nano, 2016, 10 (6), pp 5769-5781, Chem. Moter. 2015, 27, 4893-4898, and the international patent application laid-open No. WO2010/095140A.

Additional Compound

In some embodiments of the present invention, optionally, the semiconducting light emitting nanoparticle can comprise a different type of compound.

Thus, in some embodiments of the present invention, the outermost surface of the shell layers of the semiconducting light emitting nanoparticle can be over coated with different type of compounds together with the compound represented by chemical formula (I) and/or the $2^{nd}$ compound represented by chemical compound represented by chemical formula (IV) if desired.

In case one or two of said another compounds are attached onto the outer most surface of the core or the shell layer(s) of the semiconducting light emitting nanoparticle, the amount of the compounds represented by the formula (I), and/or (II) is in the range from 30 wt. % to 99.9 wt % of the total compounds attached onto the outermost surface of the core or the shell layer(s), preferably from 50 wt % to 95 wt %, more preferably it is in the range from 60 wt. % to 90 wt. %.

Without wishing to be bound by theory it is believed that such compounds may lead to disperse the semiconducting light emitting nanoparticle in a solvent more easily.

The another compounds in common use include phosphines and phosphine oxides such as Trioctylphosphine oxide (TOPO), Trioctylphosphine (TOP), and Tributylphosphine (TBP); phosphonic acids such as Dodecylphosphonic acid (DDPA), Tridecylphosphonic acid (TDPA), Octadecylphosphonic acid (ODPA), and Hexylphosphonic acid (HPA); amines such as Dedecyl amine (DDA), Tetradecyl amine (TDA), Hexadecyl amine (HDA), and Octadecyl amine (ODA), Oleylamine (OLA), thiols such as hexadecane thiol and hexane thiol; carboxylic acids such as oleic acid, stearic acid, myristic acid; acetic acid and a combination of any of these.

Examples of compounds have been described in, for example, the laid-open international patent application No. WO 2012/059931A as a ligand.

In another aspect, the invention also relates to process for preparing for the nanoparticle, wherein the process comprises at least the following step (a), optionally step (b) and step (c) in this sequence;
(a) mixing a nanoparticle having at least a core and optionally one or more shell layers, a compound and another material, preferably said another material is a solvent to get a mixture,
(b) optionally adding a second compound to said mixture,
(c) subjecting the mixture to a photo irradiation having a peak light wavelength in the range from 300 to 650 nm to the semiconducting light emitting nanoparticle, preferably in the range from 320 to 520 nm, more preferably from 350 nm to 500 nm, even more preferably from 360 nm to 470 nm, wherein said compound in step (a) is represented by chemical formula (I)

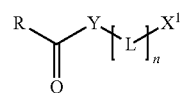

(I)

wherein n is 0 or 1, preferably n is 1;
R is

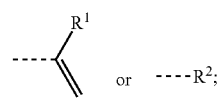

Y is S or O;
$R^1$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$ groups where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$ groups, $R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;

$R^2$ is H, D, a straight alkyl or alkoxy group having 1 to 25 carbon atoms, preferably 1 to 15 carbon atoms, more preferably 1 to 8 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$; where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$; preferably $R_2$ is a straight alkyl chain having carbon atoms 1 to 8;

L is a divalent group, preferably it is represented by following chemical formula (II) or (III),

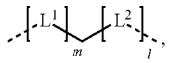 (II)

 (III)

$L^1$ is

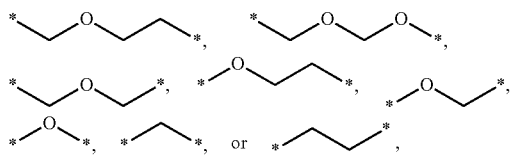

preferably $L^1$ is

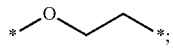

$L^2$ is

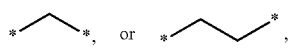

preferably $L^2$ is

where symbol "*" is a connecting point,
where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$, and where one or more H atoms may be replaced by D, F, Cl, Br, I, CN or $NO_2$, or an aromatic or heteroaromatic ring system having 5 to 60 aromatic ring atoms, which may be substituted by one or more $R^a$;
$0 \leq m \leq 50$, preferably $1 \leq m \leq 25$, more preferably $2 \leq m \leq 20$, furthermore preferably $4 \leq m \leq 12$; $0 \leq l \leq 50$, preferably $1 \leq l \leq 25$, more preferably $2 \leq l \leq 20$, furthermore preferably $4 \leq l \leq 12$;
$X^1$ is an anchor group selected from the group consisting of carboxylate group ($—COOM^1$), a primary ($—PO(OH)(OM^1)$) or secondary ($—PO(OM^1)_2$) phosphonate group, a xanthate group ($—OCS_2M^1$), $—N(M^1)_2$, $SO_3 M^1$, $S M^1$, $SiOR^2$ or ($—N(CS_2 M^1)_2$);
$M^1$ denotes a hydrogen atom, or a metal cation selected from ½ $Mg^{2+}$, ½ $Cu^{2+}$, ½ $Zn^{2+}$ or ½ $Cd^{2+}$, preferably a hydrogen atom, ½ $Mg^{2+}$, ½ $Cu^{2+}$, or ½ $Zn^{2+}$, more preferably a hydrogen atom.
and wherein said $2^{nd}$ compound in step (b) is represented by chemical formula (IV), $$M^2(Z^m)_l \qquad (IV)$$

$M^2$ is a metal cation selected from $Mg^{2+}$, $Cu^{2+}$, $Zn^{2+}$ or $Cd^{2+}$, preferably $Mg^{2+}$, $Cu^{2+}$ or $Zn^{2+}$, more preferably $Zn^{2+}$;
l is 1 in case m is 2−, l is 2 in case m is 1−;
Z is a counter anion, preferably represented by following chemical formula (V), or chemical formula (VI),

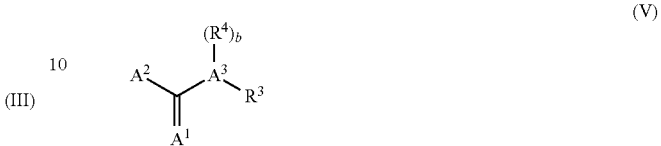 (V)

wherein $A^3$ is N, O or S;
b is 1 in case $A^3$ is N, b is 0 in case $A^3$ is O, S;
$A^1$ is O or S;
$A^2$ is $O^-$ or $S^-$;
$R^3$ is H, D, a straight alkyl or alkoxy group having 1 to 40 carbon atoms, preferably 1 to 25 carbon atoms, more preferably 1 to 15 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more $R^a$ groups where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$ groups,
$R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another;
$R^4$ is H, D, a straight alkyl or alkoxy group having 1 to 40 carbon atoms, preferably 1 to 25 carbon atoms, more preferably 1 to 15 carbon atoms, a branched or cyclic alkyl or alkoxy group having 3 to 40 carbon atoms, preferably 5 to 25 carbon atoms, more preferably 5 to 15 carbon atoms, an aromatic ring system or a hetero aromatic ring system having 3 to 40 carbon atoms, preferably 5 to 25 carbon atoms, more preferably 5 to 15 carbon atoms, which may in each case be substituted by one or more radicals $R^a$; where one or more non-adjacent $CH_2$ groups may be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$;

$$(O_2CR^5)_2 \qquad (VI)$$

$R^5$ is a straight alkyl group having 1 to 15 carbon atoms, preferably 1 to 10 carbon atoms, more preferably 1 to 8 carbon atoms, even more preferably 1 to 4 carbon atoms, further more preferably 1 to 2 carbon atoms, which may in each case be substituted by one or more $R^a$; where one or more non-adjacent $CH_2$ groups may be replaced by $R^aC$=$CR^a$, C≡C, $Si(R^a)_2$, $Ge(R^a)_2$, $Sn(R^a)_2$, C=O, C=S, C=Se, C=$NR^a$, P(=O)($R^a$), SO, $SO_2$, $NR^a$, OS, or $CONR^a$ and where one or more H atoms may be replaced by D, F, Cl, Br, I, CN or $NO_2$, or an aromatic or heteroaromatic ring system having 5 to 60 aromatic ring atoms, which may be substituted by one or more $R^a$, preferably $R^5$ is an unsubstituted straight alkyl group.

In some embodiments of the present invention, the compound of chemical formula (I) can be

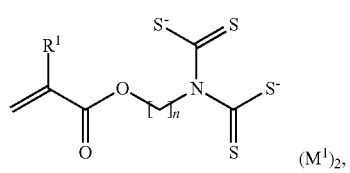

(I-1) $(M^1)_2$,

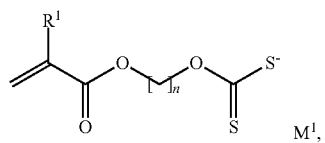

(I-2) $M^1$,

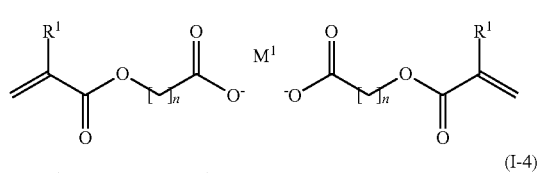

(I-3)

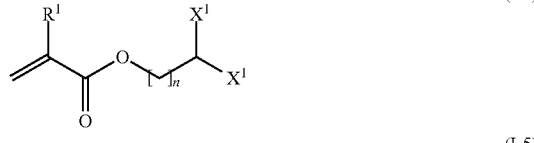

(I-4)

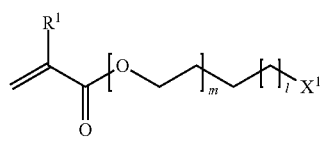

(I-5)

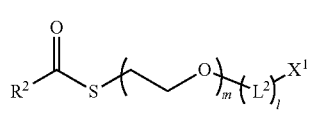

(I-7)

In some embodiments of the present invention, preferably a light source for light irradiation in step (b) is selected from one or more of artificial light sources, preferably selected from a light emitting diode, an organic light emitting diode, a cold cathode fluorescent lamp, or a laser device.

In a preferred embodiment of the present invention, the solvent is selected from one or more members of the group consisting of toluene, xylene, ethers, tetrahydrofuran, chloroform, dichloromethane and heptane.

Preferably, the mixture obtained in step (a) and/or step (b) is sealed in a transparent container, such as a vial.

In a preferred embodiment of the present invention, step (a), (b) and/or (c) are carried out in an inert condition, such as $N_2$ atmosphere.

More preferably, all steps (a), (b) and optionally step (c) are carried out in said inert condition.

In some embodiments of the present invention, the irradiation is step (b) is in the range from 0.025 to 1 watt/cm², preferably it is in the range from 0.05 to 0.5 watt/cm².

In some embodiments of the present invention, preferably, the total amount of photons absorbed by the semiconducting light emitting nanoparticle is in the range from $10^{21}$ to $10^{23}$ photons/cm², more preferably from $7 \times 10^{21}$ to $7 \times 10^{22}$ photons/cm².

The total number of absorbed photons (per cm²) at the defined wavelength is calculated according to the following equation:

$$\text{Absorbed photons} = \frac{I}{hc/\lambda} * t * (1 - 10^{-OD})$$

I=irradiation intensity [Watt/cm²]
h=Planck constant (according to the International System of Units)
c=speed of light (according to the International System of Units)
λ=wavelength [m]
t=time [sec]
OD=absorption (based on absorption spectra measured in a spectrometer).

In some embodiments of the present invention, the step (c) is carried out at the temperature below 70° C., preferably in the range from 60° C. to 0° C., more preferably in the range from 50° C. to 20° C.

In another aspect, the invention relates to semiconducting light emitting nanoparticle obtainable or obtained from the process.

Composition

In another aspect, the present invention further relates a composition comprising, essentially consisting of, or consisting of, at least one nanoparticle of the present invention, and one additional material, preferably the additional material is selected from one or more members of the group consisting of organic light emitting materials, inorganic light emitting materials, charge transporting materials, scattering particles, optically transparent polymers, anti-oxidants, radical quenchers, photo initiators and surfactants.

In a preferred embodiment of the present invention, the additional material is an optically transparent polymer.

Optically Transparent Polymers

According to the present invention, a wide variety of publicly known transparent matrix materials suitable for optical devices can be used preferably.

According to the present invention, the term "transparent" means at least around 60% of incident light transmit at the thickness used in an optical medium and at a wavelength or a range of wavelength used during operation of an optical medium. Preferably, it is over 70%, more preferably, over 75%, the most preferably, it is over 80%.

In some embodiments of the present invention, the transparent matrix material can be a transparent polymer.

According to the present invention the term "polymer" means a material having a repeating unit and having the weight average molecular weight (Mw) 1000 g/mol, or more.

The molecular weight $M_w$ is determined by means of GPC (=gel permeation chromatography) against an internal polystyrene standard.

In some embodiments of the present invention, the glass transition temperature (Tg) of the transparent polymer is 70° C. or more and 250° C. or less.

Tg is measured based on changes in the heat capacity observed in Differential scanning colorimetry like described in http://pslc.ws/macrog/dsc.htm; Rickey J Seyler, Assignment of the Glass Transition, ASTM publication code number (PCN) 04-012490-50.

For example, as the transparent polymer for the transparent matrix material, poly(meth)acrylates, epoxies, polyurethanes, polysiloxanes, can be used preferably.

In a preferred embodiment of the present invention, the weight average molecular weight (Mw) of the polymer as the transparent matrix material is in the range from 1,000 to 300,000 g/mol, more preferably it is from 10,000 to 250,000 g/mol.

Formulation

In another aspect, the present invention furthermore relates to formulation comprising, essentially consisting of, or consisting of the semiconducting light emitting nanoparticle or obtained according to the process, or the composition, and at least one solvent, preferably the solvent is selected from one or more members of the group consisting of aromatic, halogenated and aliphatic hydrocarbons solvents, more preferably selected from one or more members of the group consisting of toluene, xylene, ethers, tetrahydrofuran, chloroform, dichloromethane and heptane.

The amount of the solvent in the formulation can be freely controlled according to the method of coating the composition. For example, if the composition is to be spray-coated, it can contain the solvent in an amount of 90 wt. % or more. Further, if a slit-coating method, which is often adopted in coating a large substrate, is to be carried out, the content of the solvent is normally 60 wt. % or more, preferably 70 wt. % or more.

In another aspect, the present invention also relates to use of the semiconducting light emitting nanoparticle, the mixture, or the formulation, in an electronic device, optical device or in a biomedical device.

Use

In another aspect, the invention further relates to use of the semiconducting light emitting nanoparticle or obtained according to the process, or the composition, or the formulation in an electronic device, optical device or in a biomedical device.

Optical Medium

In another aspect, the present invention further relates to an optical medium comprising at least one semiconducting light emitting nanoparticle or obtained according to the process, or the composition of the present invention.

In some embodiments of the present invention, the optical medium can be an optical film, for example, a color filter, color conversion film, remote phosphor tape, or another film or filter.

Optical Device

In another aspect, the invention further relates to an optical device comprising at least one optical medium of the present invention.

In some embodiments of the present invention, the optical device can be a liquid crystal display, Organic Light Emitting Diode (OLED), backlight unit for display, Light Emitting Diode (LED), Micro Electro Mechanical Systems (here in after "MEMS"), electro wetting display, electro-luminescent quantum dot light emitting diode (EL-Q-LED, like described in US 2016/248029 A2, EP 2221355 A1) or an electrophoretic display, a lighting device, and/or a solar cell.

Effect of the Invention

A present invention provides one or more of following effects;

a novel semiconducting light emitting nanoparticle, which can show improved quantum yield, preferably in a solvent, more preferably in a polar solvent;

a novel semiconducting light emitting nanoparticle, which can show stable dispersion in a solvent, more preferably in a polar solvent, even more preferably in a polar solvent with higher concentration of said nanoparticles;

a novel semiconducting light emitting nanoparticle, which can show improved long-term stability, preferably in a solvent, more preferably in a polar solvent;

a novel semiconducting light emitting nanoparticle, which has improved stable surface;

a simple process for fabricating a semiconducting light emitting nanoparticle, which can show an improved quantum yield, preferably in a solvent, more preferably in a polar solvent;

a simple process for fabricating a semiconducting light emitting nanoparticle, which can show an improved long-term stability, preferably in a solvent, more preferably in a polar solvent.

The working examples 1-16 below provide descriptions of the present invention, as well as an in-detail description of their fabrication.

WORKING EXAMPLES

Working Example 1: Purification of Quantum Material (Manufactured as Described in WO2014162208 and/or U.S. Pat. No. 9,343,301 BB)

1 mL crude QDs (red emitting QDs manufactured as described in WO2014162208 and/or U.S. Pat. No. 9,343,301 BB) are purified from excess ligands using toluene and ethanol as solvent and antisolvent respectively, followed by centrifugation. The cleaning is repeated twice. The amount of organic ligands is calculated using thermal gravimetric analysis (TGA) (model TGA2, Metler Toledo). TG analysis shows 37% wt. of organic content. 20 mg of the quantum materials are dissolved in 1 ml toluene. QY is measured using Hamamatsu absolute quantum yield spectrometer (model: Quantaurus C11347).

Working Example 2: Synthesis of InP/ZnSe 112 mg of InI3, and 150 mg $ZnCl_2$ are dissolved in 2.5 ml oleylamine. At 180° C. 0.22 mL of hexaethylphosphorous triamide (DEA)3P) is added to the solution and is kept at this temperature for 20 min. After 20 min, 0.55 mL of anion shell precursor (2M TOP:Se) is added slowly in the solution. The solution is then heated by steps, followed by successive injections of cation (2.4 mL of 0.4M Zn(acetate) in Oleylamine) and anion (0.38 mL of 2M TOP:Se) shell precursor at temperatures between 200° C. and 320° C. like disclosed in *Chem. Mater.*, 2015, 27 (13), pp 4893-4898.

Working Example 3: Purification of Quantum Material from Example 2

1 mL of the sample from example 2 is purified from excess ligands using toluene and ethanol as solvent and antisolvent respectively followed by centrifugation and dried. The cleaning is repeated twice. The amount of organic ligands is calculated using thermal gravimetric analysis (TGA) (model TGA2, Metler Toledo). TG analysis showed 15% wt. of organic content.

20 mg of the quantum materials are dissolved in 1 ml toluene. QY is measured using Hamamatsu absolute quantum yield spectrometer (model: Quantaurus C11347).

Working Example 4: Surface Treatment with 2-Carboxyethylacrylate (CEA)

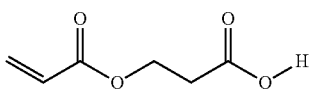

0.139 mmol (20 mg) 2-carboxyethylacrylate (552348 from Sigma-Aldrich, 900-1100 ppm MEHQ as inhibitor) is dissolved in 0.5 ml toluene. The solution is combined with 1 ml of the purified QDs solution (from example 1). The mixture is stirred for at least 16 hours, under dark at room temperature after ligand exchange 1 ml PGMEA is added, and toluene is evaporated under vacuum. The final dispersion (20 mg QD in 1 ml PGMEA) is clear. QY is measured immediately and after 2 weeks (see table 1)

Working Example 5: Surface Treatment with 11-Phosphonoundecyl Acrylate

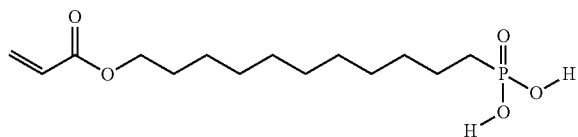 [SMILES: C=CC(=O)OCCCCCCCCCCCP(=O)(O)O]

0.228 mmol 11-phosphonoundecyl acrylate (795739 from Sigma Aldrich) is degasses for 2 hours and dissolved in 2 ml toluene. the solution is turbid. The solution is combined with 1.5 ml of crude QDs (red emitting QDs manufactured as described in WO2014162208 and/or U.S. Pat. No. 9,343,301 BB), without further purification. The mixture is stirred for 48 hours under dark at room temperature. Afterwards, toluene is completely evaporated under vacuum. 1.5 ml PGMEA is added to the dried solid. Sonication for 40 minutes is used to improve dispensability of QDs in PGMEA. The final solution (170 mg QDs in 1 ml PGMEA) is very viscous but well dispersed.

Working Example 6: Synthesis if Zinc-2 Carboxylethylacrylate (ZnCEA)

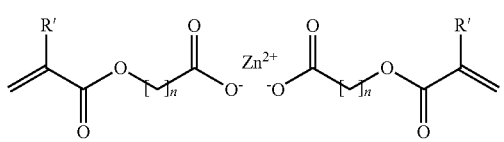

Into 500 ml round bottom flask equipped with magnetic stirrer the following reagents are added:
(a) 200 ml of THF extra dry, (b) 2-carboxyethylacrylate (1 parts) in 12 ml of THF extra dry, (c) zinc chloride (1 parts) dissolved in 24 mL of THF extra dry, (d) dipotassium carbonate (1.1 parts), (e) tetra butyl ammonium iodide (0.06 parts). Additional stirring of the mixture is allowed for 48 hours at room temperature. During stirring white solid is formed. Buchner filtration is applied to eliminate undissolved particles. Followed by solvent evaporation under vacuum without heating. The final product is highly viscous transparent liquid.

Working Example 7: Surface Treatment with Zinc-2-Carboxyethylacrylate (ZnCEA)

0.057 mmol (20 mg) Zn-CEA (prepared as described in example 6) is dissolved in 0.5 ml THF. The solution is turbid. The solution is combined with 1 ml of the purified QDs solution (see example 3). The mixture is stirred for at least 16 hours, under dark at room temperature. After ligand exchange centrifuge is applied to get rid of turbidity. 1 ml PGMEA is added, and toluene is evaporated under vacuum. The final dispersion (20 mg QD in 1 ml PGMEA) is clear after centrifuge.

Experimental Results:

TABLE 1

Quantum yield for QDs functionalized with acrylate-alkyl-carboxylic/phosphonic acids:

| Samples | QY |
| --- | --- |
| Example 1 | 76 |
| Example 3 | 58 |
| Example 4 | 81 (same after 2 weeks) |
| Example 5 | 81 |
| Example 7 | 58 |

Working Example 8: Illumination Set Up

A lighting setup built with Philips Fortimo 3000 lm 34 W 4000K LED downlight module (with it is phosphor disc removed). A 1.9 nm thick Perspex Pane® is placed on top of this.

The distance between the LEDs and the Perspex Pane® is 31.2 mm. the 20 ml sealed sample vials are placed on the Perspex Pane® inside a plastic cylinder, diameter 68 mm height 100 mm. Then the cylinder is closed with a cardboard top as described in FIG. 1.

Photo enhancement system: The vials with the solution of QDs are placed on the Perspex plate of the setup described above and illuminated from below. To prevent the solution from extensive heating and evaporation of the solvent, the vials are placed in the water bath (a glass beaker with water).

The peak wavelength of the illumination is 455 nm. The irradiance at 450 nm is measured by an Ophir Nova II® and PD300-UV photodetector and measured to be 300 mW/cm$^2$.

Working Example 9: Surface Treatment with 11-Acetylmercaptoundecylphosphonic Acid 0.096 mmol (30 mg) 11-acetylmercaptoundecylphosphonic acid (760145 from Sigma-Aldrich) are dissolved in 0.5 ml THF. The solution is combined with 1 ml of the purified QDs solution (from example 1). The mixture is stirred for at least 16 hours, under dark at room temperature. Afterward, QDs are dried under vacuum, followed by addition of 1 ml PGMEA. The dispersion is very clear. QY is measured (see table 2). Higher loading of QDs (150 mg/mL) in PGMEA is achieved by multiplying the ligand and QDs amounts by a factor of 5.

Working Example 10: Synthesis of InP/ZnSeS 0.085 g ZnCl2 and 0.35 μmol core treated InP dos are dissolved in 200 μL toluene and 4.8 ml oleylamine. The mixture is heated to 250° C. for 30 minutes. At 180° C., 2.6 ml ZnCl2 in oleylamine is added. afterward, 0.36 ml of TOP:Se (2M) is added dropwise. the mixture is heated to 200° C. for 60 min and to 320° C. for 30 min. Then, 3.1 ml zinc stearate (0.4M) in oleylamine is added dropwise. and after 10 min 0.3 ml TOP:S (2.2 M) is injected. after 180 min at 320° C. the mixture is cooled to room temperature.

Working Example 11: Purification of Quantum Material from Example 10

1 mL of the sample from example 10 is purified from excess ligands using toluene and ethanol as solvent and antisolvent respectively followed by centrifugation. This step is repeated twice. The precipitant is dissolved in hexane followed by centrifugation and drying. The amount of organic ligands is calculated using thermal gravimetric analysis (TGA) (model TGA2, Metler Toledo). TG analysis showed 20% wt. of organic content. 30 mg of the quantum materials are dissolved in 1 ml toluene. QY is measured using Hamamatsu absolute quantum yield spectrometer (model: Quantaurus C11347).

Example 12: Surface Treatment with 11-Acetylmercaptoundecylphosphonic Acid 0.096 mmol (30 mg) 11-acetylmercaptoundecylphosphonic acid (760145 from Sigma-Aldrich) is dissolved in 0.5 ml THF. The solution is combined with 1 ml of the purified QDs solution (from example 11). The mixture is stirred for at least 16 hours, under dark at room temperature. Afterward, QDs are washed and purified by addition of 4 ml of ethanol followed by centrifuge (5000 rpm, 5 min), and drying under vacuum. Finally, 1 ml of PGMEA is added and the dispersion is heated by fan for few minutes. The final dispersion (30 mg QD in 1 ml PGMEA) is clear. QY is measured (see table 2).

Higher loading of QDs (120 mg/mL) in PGMEA is achieved by multiplying the ligand and QDs amount by a factor of 4.

Example 13: Illumination of QDs Treated with 11-Acetylmercaptoundecylphosphonic Acid A solution described in example 12 is placed under illumination for 24 hours. After 24 hours the quantum yield of the sample is measured using Hamamatsu absolute quantum yield spectrometer (model: Quantaurus C11347). The quantum yield of the illuminated sample is measured right after the illumination is stopped and 8 days after stopping the illumination, while the sample is kept in fridge at 4° C.

TABLE 2

Quantum yield for QDs functionalized with acrylate-alkyl-carboxylic/phosphonic acids:

| Samples | QY (%) |
|---|---|
| Example 9 | 71 |
| Example 11 | 45 |
| Example 12 | 35 |
| Example 13 | 47 (QY measured after 8 days is unchanged) |

Example 14: Surface Treatment with Zinc Diethyldithiocarbamate (ZnC2DTC) in Toluene and Illumination 0.041 mmol (15 mg) ZnC2DTC (329703 from Sigma-Aldrich) is degassed for 10 min using Argon, and is dissolved in 0.5 ml toluene. The solution is combined with 0.6 ml of the purified QDs solution (from Example 11). The mixture is stirred for at least 16 hours, under illumination (as described in Example 8). QY is measured (see table 3). this mixture is not soluble in PGMEA. therefore, a second surface treatment is performed (see example 15).

Example 15: Addition Surface Treatment of the QDs from Example 14 with 2-Carboxyethyl Acrylate (2CEA) in Toluene 0.104 mmol 2CEA (15 mg) (552348 Sigma Aldrich) is degassed for 15 min using Argon. Afterward, the QDs solution from Example 14 is added to 2CEA and mixed. Toluene solution is concentrated to a minimum amount (about 0.3 ml) before 0.7 ml of PGMEA is added. residues of toluene are evaporated. QY of the dispersion in PGMEA is measured (see table 3).

Example 16: Surface Treatment of QDs from Example 11 with 2CEA in Toluene 0.104 mmol 2CEA (15 mg) (552348 Sigma Aldrich) is degassed for 15 min using Argon. Afterward, 0.5 ml of the QDs solution from Example 11 is added to 2CEA. Afterwards, the dispersion is precipitated. The solid part after centrifuge is dissolved in THF. Then, minimum amount of toluene (0.2 mL) and PGMEA are added and residues of toluene are removed. The dispersion in PGMEA is clear. QY of the dispersion is measured 24 hours after mixing. The dispersion is stored at fridge for 7 days and QY is measured again. QY is stable and no drop is recognized.

TABLE 3

Quantum yield for QDs functionalized with ZnC2DTC and 2CEA:

| Samples | QY (%) | CWL (nm) | FWHM (nm) |
|---|---|---|---|
| Example 14 | 67 | 634 | 54 |
| Example 15 | 68 | 634 | 54 |
| Example 16 | 43 | 636 | 60 |

The dispersion in example 11 is not soluble in PGMEA. Therefore, addition of a second ligand as described in Example 15 is needed to impart solubility in PGMEA.

The invention claimed is:

1. A semiconducting light emitting nanoparticle comprising at least a core, one or more shell layers wherein at least one of the shell layers comprises a $1^{st}$ element of group 12, 13 or 14 of the periodic table and a $2^{nd}$ element of group 15 or 16 of the periodic table, and a compound of chemical formula (I) or formula (I-3):

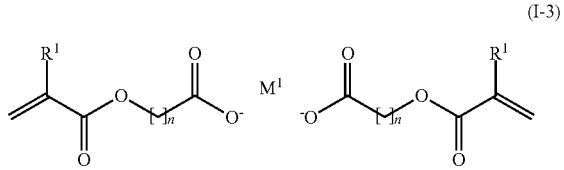

wherein
n is 0 or 1;
R is

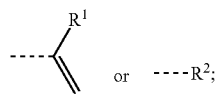

Y is S or O;
R¹ is H, D, a straight alkyl or alkoxy group having 1 to 25 carbon atoms, a branched or cyclic alkyl or alkoxy group having 3 to 40 carbon atoms, an aromatic ring system or a hetero aromatic ring system having 3 to 40 carbon atoms, which may in each case be substituted by one or more $R^a$ groups where one or more non-adjacent $CH_2$ groups may each be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, $SO$, $SO_2$, $NR^a$, $OS$, or $CONR^a$ and where one or more H atoms may each be replaced by D, F, Cl, Br, I, CN or $NO_2$, or an aromatic or heteroaromatic ring system having 5 to 60 aromatic ring atoms, which may be substituted by one or more $R^a$ groups;
$R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may each be replaced by D, F, Cl, Br, I, and wherein two or more adjacent substituents $R^a$ here may also form a mono- or polycyclic, aliphatic, aromatic or heteroaromatic ring system with one another;
R² is H, D, a straight alkyl or alkoxy group having 1 to 25 carbon atoms, a branched or cyclic alkyl or alkoxy group having 3 to 40 carbon atoms, an aromatic ring system or a hetero aromatic ring system having 3 to 40 carbon atoms, which may in each case be substituted by one or more $R^a$ where one or more non-adjacent $CH_2$ groups may each be replaced by $R^aC=CR^a$, $C\equiv C$, $Si(R^a)_2$, $Ge(R^a)_2$, $Sn(R^a)_2$, $C=O$, $C=S$, $C=Se$, $C=NR^a$, $P(=O)(R^a)$, $SO$, $SO_2$, $NR^a$, $OS$, or $CONR^a$, and where one or more H atoms may each be replaced by D, F, Cl, Br, I, CN or $NO_2$, or an aromatic or heteroaromatic ring system having 5 to 60 aromatic ring atoms, which may be substituted by one or more $R^a$;
L is a divalent group;
X¹ is an anchor group selected from $—PO(OM^1)_2$, $N(M^1)_2$, $SiOR^2$, and $—N(CS_2M^1)_2$; and
in formula (I) M¹ denotes a hydrogen atom and in formula (I-3) M¹ is a metal cation selected from $Mg^{2+}$, $Cu^{2+}$, $Zn^{2+}$, and $Cd^{2+}$; and said nanoparticle further comprising a 2$^{nd}$ compound of chemical formula (IV), $$M^2(Z^m)_l \qquad (IV)$$

wherein
M² is a metal cation selected from $Mg^{2+}$, $Cu^{2+}$, $Zn^{2+}$ and $Cd^{2+}$;
l is 1 in case m is 2−, l is 2 in case m is 1−;
Z is a counter anion.

2. The nanoparticle according to claim 1, wherein Y is O in case R is

and
Y is S in case R is $--------R^2$.

3. The nanoparticle according to claim 1, where the nanoparticle comprises a core, one or more shell layers, and the compounds of chemical formula (I) or formula (I-3) and chemical formula (IV) according to claim 1 in this sequence.

4. The nanoparticle according to claim 1, wherein Y is O and R is

5. The nanoparticle according to claim 1, wherein Y is S and R is $--------R^2$.

6. The nanoparticle according to claim 1, wherein the weight ratio of the compound of chemical formula (I) or formula (I-3) and the compound of chemical formula (IV) is in the range of 1:100 (the compound of chemical formula (I)/formula (I-3):the compound of chemical formula (IV)).

7. The nanoparticle according to claim 6, wherein the weight ratio of the compound of chemical formula (I) or formula (I-3) and the compound of chemical formula (IV) is 3:50.

8. The nanoparticle according to claim 1, wherein L is of formula (II) or (III),

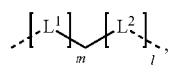

L¹ is

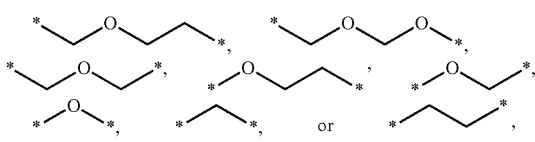

and

L² is

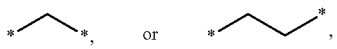

where symbol "*" is a connecting point, where one or more non-adjacent CH₂ groups may each be replaced by $R^aC=CR^a$, $Si(R^a)_2$, $Ge(R^a)_2$, $Sn(R^a)_2$, C=O, C=S, C=Se, $C=NR^a$, $P(=O)(R^a)$, SO, SO₂, $NR^a$, OS, or $CONR^a$, and where one or more H atoms may each be replaced by D, F, Cl, Br, I, CN or NO₂, or an aromatic or heteroaromatic ring system having 5 to 60 aromatic ring atoms, which may be substituted by one or more $R^a$;

0≤m≤50; and

0≤l≤50.

9. The nanoparticle according to claim 8, wherein the compound of chemical formula (I) or formula (I-3) is a compound of one of the following subformulas:

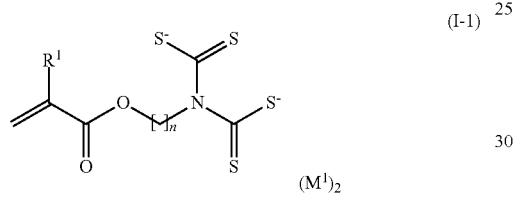

(I-1)

wherein M¹ is H,

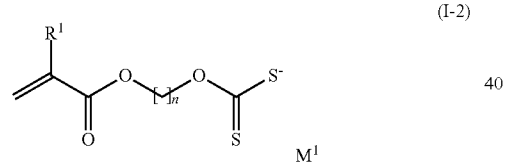

(I-2)

wherein M¹ is H,

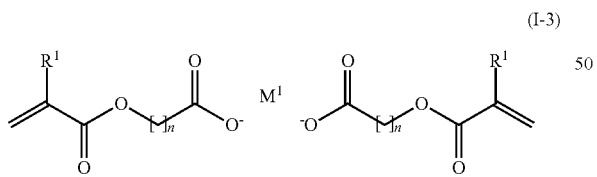

(I-3)

wherein M¹ is Mg²⁺, Cu²⁺, Zn²⁺, or Cd²⁺, and

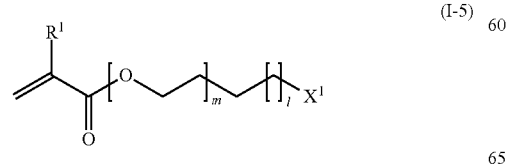

(I-5)

wherein M¹ is H, 0≤m≤50, and 0≤l≤50.

10. The nanoparticle according to claim 1, wherein Z is a counter anion of formula (V) or formula (VI),

(V)

wherein

A³ is N, O or S, b is 1 in case A³ is N, b is 0 in case A³ is O or S,

A¹ is O or S,

A² is O⁻ or S⁻,

R³ is H, D, a straight alkyl or alkoxy group having 1 to 40 carbon atoms, a branched or cyclic alkyl or alkoxy group having 3 to 40 carbon atoms, an aromatic ring system or a hetero aromatic ring system having 3 to 40 carbon atoms, which may in each case be substituted by one or more $R^a$ groups where one or more non-adjacent CH₂ groups may each be replaced by $R^aC=CR^a$, $Si(R^a)_2$, $Ge(R^a)_2$, $Sn(R^a)_2$, C=O, C=S, C=Se, $C=NR^a$, $P(=O)(R^a)$, SO, SO₂, $NR^a$, OS, or $CONR^a$, and where one or more H atoms may each be replaced by D, F, Cl, Br, I, CN or NO₂, or an aromatic or heteroaromatic ring system having 5 to 60 aromatic ring atoms, which may be substituted by one or more $R^a$ groups, $R^a$ is at each occurrence, identically or differently, H, D, or a straight alkyl or alkoxy group having 1 to 25 carbon atoms, branched or cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may each be replaced by D, F, Cl, Br, I, and wherein two or more adjacent substituents $R^a$ here may also form a mono- or polycyclic, aliphatic, aromatic or heteroaromatic ring system with one another, and R⁴ is H, D, a straight alkyl or alkoxy group having 1 to 40 carbon atoms, a branched or cyclic alkyl or alkoxy group having 3 to 40 carbon atoms, an aromatic ring system or a hetero aromatic ring system having 3 to 40 carbon atoms, which may in each case be substituted by one or more radicals $R^a$, and where one or more non-adjacent CH₂ groups may each be replaced by $R^aC=CR^a$, $Si(R^a)_2$, $Ge(R^a)_2$, $Sn(R^a)_2$, C=O, C=S, C=Se, $C=NR^a$, $P(=O)(R^a)$, SO, SO₂, $NR^a$, OS, or $CONR^a$ and where one or more H atoms may be replaced by D, F, Cl, Br, I, CN or NO₂, or an aromatic or heteroaromatic ring system having 5 to 60 aromatic ring atoms, which may be substituted by one or more $R^a$;

$(O_2CR^5)_2$        (VI)

wherein

R⁵ is a straight alkyl group having 1 to 15 carbon atoms, which may in each case be substituted by one or more $R^a$, where one or more non-adjacent CH₂ groups may each be replaced by $R^aC=CR^a$, $Si(R^a)_2$, $Ge(R^a)_2$, $Sn(R^a)_2$, C=O, C=S, C=Se, $C=NR^a$, $P(=O)(R^a)$, SO, SO₂, $NR^a$, OS, or $CONR^a$, and where one or more H atoms may each be replaced by D, F, Cl, Br, I, CN or NO₂, or an aromatic or heteroaromatic ring system having 5 to 60 aromatic ring atoms, which may be substituted by one or more $R^a$.

11. A process for preparing for the nanoparticle according to claim 1, wherein the process comprises at least the following step (a), step (b), and step (c) in this sequence:
(a) mixing a nanoparticle having at least a core and one or more shell layers, a compound of formula (I) or formula (I-3), and a solvent to obtain a mixture,
(b) adding a $2^{nd}$ compound of formula (IV) to said mixture, and
(c) subjecting the mixture to a photo irradiation having a peak light wavelength in the range from 300 to 650 nm to the semiconducting light emitting nanoparticle.

12. The process according to claim 11, wherein a light source for light irradiation in step (c) is selected from one or more of artificial light sources.

13. The process according to claim 11, wherein the intention of the light irradiation in step (c) is in the range from 0.025 to 1 watt/cm².

14. The process according to claim 11, wherein the step (c) is carried out at the temperature below 70° C.

15. The process according to claim 11, wherein step (b) is carried out after step (a) and wherein weight ratio of the compound of chemical formula (I) or formula (I-3) and the compound of chemical formula (IV) in step (b) is in the range of 1:100 (the compound of chemical formula (I)/formula (I-3):the compound of chemical formula (IV)).

16. A semiconducting light emitting nanoparticle obtained from the process according to claim 11.

17. A composition comprising at least the nanoparticle according to claim 1, and an additional material.

18. The composition according to claim 17, wherein said one additional material is selected from one or more members of the group consisting of organic light emitting materials, inorganic light emitting materials, charge transporting materials, scattering particles, optically transparent polymers, anti-oxidants, radical quenchers, photo initiators, and surfactants.

19. A formulation comprising at least the nanoparticle according to claim 1, and a solvent.

20. The formulation according to claim 19, wherein said solvent is selected from one or more members of the group consisting of propylene glycol methyl ether acetate, ethyl acetate, butyl acetate, amyl acetate, ethylene carbonate, methoxy propyl acetate, methyl ethyl ketone, methyl isobutyl ketone, cyclohexanone, propylene glycol, butylene glycol, triethylene glycol, glycol ethers, heylene glycol, diethyl ethers, tetrahydrofuran, methanol, ethanol, isopropanol, and butanol.

21. An electronic device, optical device or in a biomedical device containing a nanoparticle according to claim 1.

22. An optical medium comprising the nanoparticle according to claim 1.

23. An optical device comprising said optical medium according to claim 22.

24. A formulation comprising the composition of claim 17 and a solvent.

25. An optical medium comprising the composition of claim 17.

* * * * *